(12) United States Patent
Morioka et al.

(10) Patent No.: US 7,515,365 B2
(45) Date of Patent: Apr. 7, 2009

(54) LENS FIXING APPARATUS AND METHOD

(75) Inventors: Hideo Morioka, Mie (JP); Masatoshi Koike, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 203 days.

(21) Appl. No.: 11/193,356

(22) Filed: Aug. 1, 2005

(65) Prior Publication Data

US 2006/0067082 A1    Mar. 30, 2006

(30) Foreign Application Priority Data

Sep. 24, 2004    (JP) ............................. 2004-277262

(51) Int. Cl.
  *G02B 7/02* (2006.01)
(52) U.S. Cl. ....................... 359/819; 362/449
(58) Field of Classification Search ................. 359/379, 359/506, 819–823, 82, 649, 449; 362/449
  See application file for complete search history.

(56) References Cited

U.S. PATENT DOCUMENTS

| 5,455,715 | A | * | 10/1995 | Okubo | 359/827 |
| 6,876,504 | B2 | * | 4/2005 | Peng et al. | 359/819 |
| 6,963,455 | B2 | * | 11/2005 | Nomura et al. | 359/694 |
| 2006/0050417 | A1 | * | 3/2006 | Ooi et al. | 359/819 |
| 2006/0109668 | A1 | * | 5/2006 | Schmieder et al. | 362/455 |

FOREIGN PATENT DOCUMENTS

JP    A 7-287153    10/1995

* cited by examiner

*Primary Examiner*—Hung X Dang
*Assistant Examiner*—Vipin M Patel
(74) *Attorney, Agent, or Firm*—Oliff & Berridge, PLC

(57) ABSTRACT

A lens unit is inserted to be arranged in a holder portion substantially in a cylindrical shape. The lens unit is rotatably attached with an adjuster. The adjuster is able to be screwed into the holder portion. By rotating the adjuster while being screwed in the holder portion in a state of inserting to arrange the lens unit in the holder portion, the lens unit 5 moves in an axial direction of the holder portion to adjust a position thereof.

8 Claims, 5 Drawing Sheets

LENS FIXING APPARATUS AND METHOD

BACKGROUND OF THE INVENTION

1. Field of the Invention

The present invention relates to a lens fixing apparatus and method which can fix a lens unit in a camera.

2. Description of the Related Art

There is a lens fixing portion structure in a camera in which a lens holder portion substantially in a cylindrical shape is arranged frontward from an image taking element, and a lens unit is fixed at inside of the lens holder portion.

Here, in attaching the lens unit, it is necessary to adjust a distance of separating the lens unit and the image taking element from a necessity of adjusting a focal length or the like.

According to a method of adjusting a position of the lens unit of the related art, it is general to move the lens unit in an axial direction by rotating the lens unit per se by a screw at inside of the lens holder portion. To adjust a screw is facilitated. Durability against load in an axial direction of the lens unit can be provided.

However, depending on a lens which is at inside of the lens unit, it is necessary to maintain a rotational position of the lens unit at a constant position relative to the image taking element.

In the related art, the following structure can be adapted to fix the lens unit in the lens holder. The lens unit is movably arranged in the lens holder portion along the axial direction thereof. The lens unit is fixed in the axial direction by using a setscrew or an adhering agent in a state that a position of the lens unit being adjusted along a direction of inserting the lens unit into the lens holder portion.

SUMMARY OF THE INVENTION

However, according to the above-described structure, the position cannot be adjusted by using a screw structure and therefore, it is necessary to carry out an operation of fixing the lens holder portion by screwing the setscrew or solidifying the adhering agent while maintaining a state of pertinently adjusting a relative positional relationship between the lens unit and the lens holder portion by the hand of an operator or the like. Therefore, the operation of adjusting the position of the lens unit and the fixing operation in the pertinently adjusted state are difficult.

It is an object of the invention to provide a lens fixing apparatus and method which are capable of easily carrying out an operation of adjusting a position and an operation of fixing a lens unit.

According to one aspect of the invention, there is provided a lens fixing apparatus including: a lens holder portion substantially formed in a cylindrical shape; a lens unit operable to be inserted to be arranged in the lens holder portion; and an adjuster member being rotatably attached to around either one of an axis of the lens holder portion and an axis of the lens unit, the adjuster member operable to be screwed to the other of the lens holder portion and the lens unit. The lens unit is movable in an axial direction of the lens holder portion by rotating the adjuster member while being screwed therewith.

According to the above-aspect, the lens unit can be moved along the axial direction of the lens holder portion by rotating the adjuster member while being screwed therewith. The lens unit can be stopped to move by stopping to rotate the adjuster member. Therefore, the operation of adjusting the position of the lens unit can easily be carried out and the operation of fixing the lens unit can easily be carried out.

According to another aspect of the invention, the adjuster member is outwardly fitted or inwardly fitted rotatably to either one of the lens holder portion and the lens unit. A retaining member retains the fitted adjuster member.

By thus configuration, the adjuster member can rotatably be attached by simple configuration and in a state of being firmly held to be retained.

According to another aspect of the invention, the lens fixing apparatus further includes at least one screw fixing to the lens holder portion at least one of the adjuster member and the lens unit.

When at least one of the adjuster member and the lens unit is further provided with at least one screw fixed to the lens holder portion, the lens unit can further firmly be fixed to the lens holder portion.

According to another aspect of the invention, either one of an inner peripheral portion of the lens holder portion and an outer peripheral portion of the lens unit is formed with a recess groove portion along a direction of inserting the lens unit. The other one of the inner peripheral portion of the lens holder portion and the outer peripheral portion of the lens unit is formed with a projected portion capable of being fitted into the recess groove portion movably along a longitudinal direction thereof.

By thus configuration, the lens unit can be moved along the axial direction of the lens holder portion while restraining rotation of the lens unit relative to the lens holder portion.

According to another aspect of the invention, the adjuster member is rotatably attached to the outer peripheral portion of the lens unit. An outer peripheral portion of the adjuster member is formed with a male screw portion. The inner peripheral portion of the lens holder portion is formed with a female screw portion. The adjuster member is screwed to the lens holder portion in a state of inserting the lens unit and the adjuster member into the lens holder portion.

When the adjuster member is screwed to the lens holder portion in the state of inserting the lens unit and the adjuster member into the lens holder portion, By screwing the adjuster member into the lens holder portion, the apparatus can be a comparatively compact.

DESCRIPTION OF THE PREFERRED EMBODIMENTS

Embodiments

Figure 1:
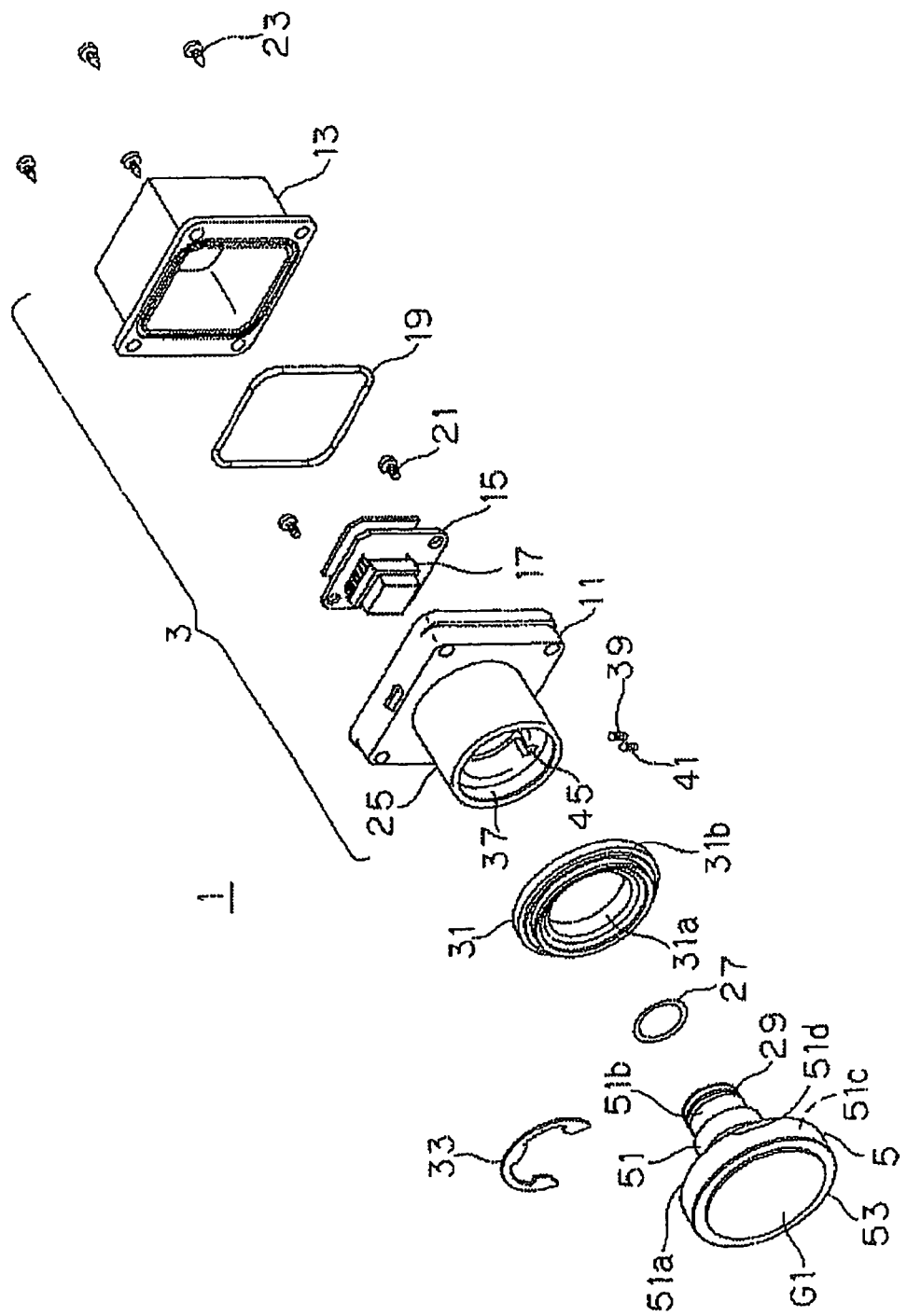
FIG. 1 is a disassembled perspective view showing a camera apparatus according to an embodiment of the invention.
Figure 2:
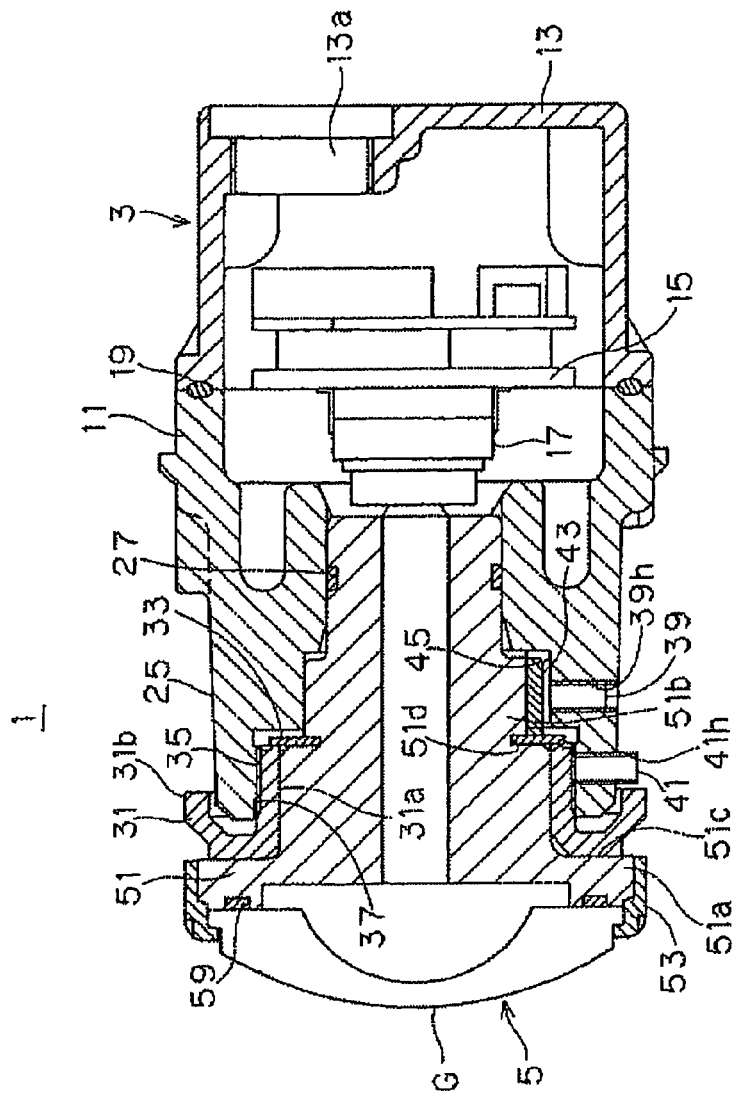
FIG. 2 is a sectional view showing the camera apparatus.

An explanation will be given of a camera apparatus applied with a lens fixing structure according to the invention as follows. FIG. 1 is a disassembled perspective view of the camera apparatus, and FIG. 2 is a sectional view of the camera apparatus.

The camera apparatus 1 is provided with a camera main body 3, a lens unit 5, and an adjuster 31. The lens fixing portion structure is for fixing the lens unit 5 at a position frontward from an image taking element 17 integrated to the camera main body 3 to be able to adjust a position thereof.

The camera main body 3 is provided with a front side case 11, a rear side case 13, and a board unit 15.

The board unit 15 is provided with the image taking element 17. The board unit 15 is fixed to inside of the front side case 11 by a screw 21.

The front side case 11 and the rear side case 13 are fixed to each other by a screw 23 in a state of sealing therebetween by a packing 19. Thereby, the board unit 15 is at inside of a space substantially in a cabinet-like shape configured by the front side case 11 and the rear side case 13. Further, a hole 13a provided at the rear side case 13 is for drawing out a connection cable.

Further, a front face side of the front side case 11 is provided with a holder portion 25 substantially in a cylindrical shape for holding the lens unit 5. The image taking element 17 is brought into a positional relationship of facing an opening at inside of the holder portion 25. The lens unit 5 is inserted to be arranged at the holder portion 25 from a front side.

The lens unit 5 is provided with a lens groove G, a lens-barrel 51 substantially in a cylindrical shape, and a lens holder 53 in a ring-like shape.

The lens groove G is a lens system having two properties of wide angle and an amorphosis and is provided with a plurality of lenses. In a state of containing the respective lenses in the lens-barrel 51, the lens holder 53 is screwedly attached to the lens-barrel 51.

The lens-barrel 51 has a large diameter portion 51a and a small diameter portion 51b on a rear end side by interposing a stepped portion 51c therebetween. The small diameter portion 51b thereamong is made to be able to be inserted into the holder portion 25.

Further, a positioning recess portion 51d is formed at a position of an outer peripheral portion of the small diameter portion 51b remote rearward from the stepped portion 51c by a predetermined distance. A stop ring 33 as a retaining member, mentioned later, is fixed to the positioning recess portion 51d.

Further, a peripheral groove 29 is formed at a portion of the outer peripheral portion of the small diameter portion 51b rearward from the positioning recess portion 51d. The peripheral groove 29 is fitted with a packing 27 forming a ring-like elastic member. Further, By inserting to fix the small diameter portion 51b into the holder portion 25 in a state of being fitted with the packing 27, the packing 27 is interposed between an outer peripheral face of the lens unit 5 and an inner peripheral face of the holder portion 25 in a state of being compressed therebetween to thereby seal a clearance therebetween.

The adjuster 31 is a member for adjusting a position of fixing the lens unit 5 along an axial direction of the holder portion 25. Here, the adjuster 31 is outwardly fitted to an outer peripheral portion of the lens unit 5 rotatably and in a state of being prevented from being drawn out and is made to be able to be screwed to the inner peripheral portion of the holder portion 25. The lens unit 5 moves along the axial direction of the holder portion 25 by rotating the adjuster 31 while being screwed to the holder portion 25.

Explaining further specifically, the adjuster 31 is provided with an adjuster main body portion 31a capable of being outwardly fitted to a portion of the outer peripheral portion of the small diameter portion 51b frontward from the positioning recess portion 51d, and a flange-like operating portion 31b extended to an outer side in a diameter direction from a front portion of the adjuster main body portion 31a.

The adjuster main body portion 31a of the adjuster 31 is outwardly fitted rotatably to a portion of the outer peripheral portion of the small diameter portion 51b frontward from the positioning recess portion 51d. Further, by fixing the stop ring 33 to the positioning recess portion 51d, the adjuster 31 is held between the stepped portion 51c and the stop ring 33 rotatably and in a state of being retained.

Here, the stop ring 33 is a member retaining the adjuster 31. The stop ring 33 is configured by punching a metal plate substantially in a C-like shape. The stop ring 33 has projections on an inner peripheral side at a pertinent interval therebetween. The stop ring 33 is fixed to the outer peripheral portion of the small diameter portion 51b by fitting the projections on the inner peripheral side to the positioning recess portion 51d while elastically deforming the stop ring 33.

Further, a male screw portion 35 is formed at an outer peripheral portion of the adjuster 31 and a female screw portion 37 is formed on a front end side of an inner peripheral portion of a front end portion of the holder portion 25. Further, by inserting the small diameter portion 51b of the lens unit 5 into the holder portion 25, the male screw portion 35 is brought into a state of being able to be screwed to the female screw portion 37. Under the state, the flange-like operating portion 31b is exposed to an outer side by passing an interval between the holder portion 25 and the large diameter portion 51a. Further, when the adjuster 31 is rotated while screwing the male screw portion 35 of the adjuster 31 to the female screw portion 37 of the holder portion 25 by grabbing the flange-like operating portion 31b, an amount of screwing the adjuster 31 to the holder portion 25 is changed and the adjuster 31 is moved along the axial direction of the holder portion 25. At this occasion, since the adjuster 31 is held by the lens unit 5 in a state of being prevented from being drawn out, also the lens unit 5 is moved along the axial direction integrally with adjuster 31. By rotating the adjuster 31 pertinently in a fastening direction or a loosening direction, the lens unit 5 is moved frontward or rearward along the axial direction to thereby adjust the position of the lens unit 5 relative to a light receiving face of the image taking element 17.

Further, according to the lens fixing portion structure, after adjusting the position as described above, the lens unit 5 and the adjuster 31 are fixed to the holder portion 25 by screws 39, 41. That is, the holder portion 25 is formed with two screw holes 39h, 41h. Further, by screwing to fasten the screw 39 to the screw hole 39h on one side, the screw 39 is brought into contact with the small diameter portion 51b to finally position to fix the lens unit 5. Further, by screwing to fasten the screw 41 to the screw hole 41h on other side, the screw 41 is brought into contact with the adjuster 31 to stop to rotate the adjuster 31.

Further, according to the lens fixing portion structure, an inner peripheral portion of the holder portion 25 is formed with a recess groove portion 45 along the direction of inserting the lens unit 5, and an outer peripheral portion of the lens unit 5 is formed with a projected portion 43 to be able to be fitted into the recess groove portion 45 movably in a longitudinal direction thereof. Further, by inserting the small diameter portion 51b of the lens unit 5 into the holder portion 25 while fitting the projected portion 43 into the recess groove portion 45, rotation of the lens unit 5 is restricted.

In the camera apparatus 1 adopting the anamorphic optical system for the lens groove G, it is necessary to adjust the position in a state of prohibiting rotation of the lens unit 5 and therefore, the above-described configuration is effective.

According to the embodiment, the lens fixing portion structure is capable of adjusting the position of the lens unit 5 by combining the holder portion 25, the lens unit 5 inserted to be arranged in the holder portion 25 and the adjuster 31 for moving the lens unit 5.

According to the lens fixing apparatus as described above, the adjuster 31 is outwardly fitted to the outer peripheral portion of the lens unit 5 rotatably and in a state of being retained (state of being positioned in the axial direction), and is made to be screwed to the inner peripheral portion of the holder portion 25. Therefore, by rotating the adjuster 31 while being screwed to the holder portion 25, the lens unit 5 can be moved along the axial direction of the holder portion 25, further, by stopping to rotate the adjuster 31, the fixing operation by the screws 39, 41 and the like can be carried out while stopping to move the lens unit 5 to be maintained in a pertinently adjusted state. Therefore, the operation of adjusting the position of the lens unit 5 can easily be carried out by rotating the adjuster 31 and the operation of fixing the lens unit can easily be carried out by stopping to rotate the adjuster 31.

Further, by holding the adjuster 31 to be retained by attaching to fix the stop ring 33 to the lens-barrel in the state of outwardly fitting the adjuster 31 to the lens-barrel 51, the adjuster 31 can further firmly be retained by a simple design. Further, since the member formed in the ring-like shape can be used as the stop ring 33, screwing in adjusting the position can smoothly be carried out.

Further, since the adjuster 31 and the lens unit 5 are positioned to fix by the screws 39, 41 after moving the lens unit 5 along the axial direction of the holder portion 25 to thereby adjust the position, the lens unit 5 can further firmly be fixed to the holder portion 25. Further, only one of the screws 39, 41 may be used.

Further, since the recess groove portion 45 is formed at the inner peripheral portion of the holder portion 25 and the projected portion 43 is formed at the outer peripheral portion of the lens unit 5, the lens unit 5 can be inserted to be arranged in the holder portion 25 by movably fitting the projected portion 43 into the recess groove portion 45. Thereby, the lens unit 5 can be moved along the axial direction of the holder portion 25 while restraining rotation of the lens unit 5 relative to the holder portion 25.

Further, a recess groove portion may be formed at the outer peripheral portion of the lens unit 5 and a projected portion may be formed at the inner peripheral portion of the holder portion 25.

Since the adjuster 31 is rotatably attached to the outer peripheral portion of the lens unit 5, the adjuster 31 is screwed to the holder portion 25 in the state in which the male screw portion 35 is formed at the outer peripheral portion of the adjuster 31, the female screw portion 37 is formed at the inner peripheral portion of the holder portion 25 and the lens unit 5 and the adjuster 31 are inserted into the holder portion 25, various configurations are included into the holder portion 25 and a comparatively compact constitution can be constructed.

MODIFIED EXAMPLES

Modified examples will be explained as follows. Further, in respectives of FIG. 3 through FIG. 10, for convenience of explanation, the lens unit 5, the holder portion 25 and the like are simplifiedly drawn.

In the above-embodiment, the stop ring 33 is attached in later. However, the structure to hold the adjuster 31 relative to the lens unit 5 rotatably and in the state of being retained is not limited.

Figure 3:
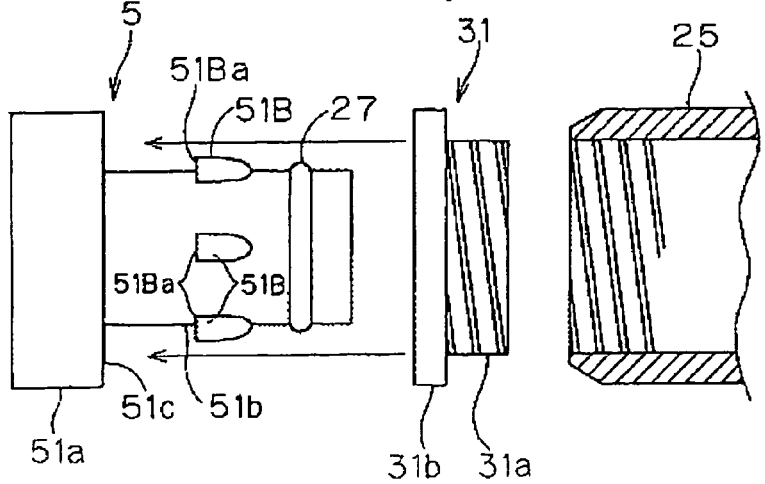
FIG. 3 is an explanatory view showing a first modified example.

For example, according to a first modified example shown in FIG. 3, the small diameter portion 51b of the lens unit 5 is formed with a positioning projected portion 51B in place of the positioning recess portion 51d. The positioning projected portion 51B is successively projected in a front direction of the lens unit 5 and a front end portion thereof is formed into a vertical locking face 51Ba directed in the front direction of the lens unit 5. Further, when the ring-like adjuster 31 is pressed to be outwardly fitted to the lens unit 5 rearward therefrom, the adjuster 31 is brought into sliding contact with a rear back portion of the positioning projected portion 51B. Further, when the adjuster 31 is pressed by a stronger force, the adjuster 31 and the lens unit 5 are more or less bent to deform, and the adjuster 31 rides over the positioning projected portion 51B. Thereby, the adjuster 31 is rotatably held in a state of being positioned in a state of being prevented from being drawn out between the large diameter portion 51a and the vertical locking face 51Ba.

According to the first modified example, it is not necessary to use a separate member for positioning to hold the adjuster 31 and therefore, the constitution can be simplified.

Figure 4:
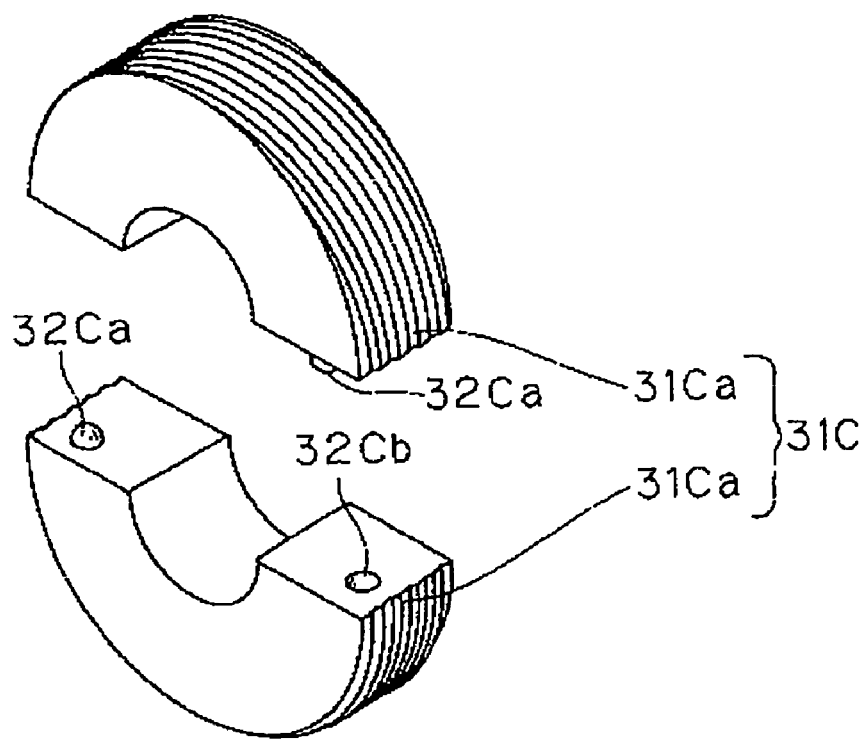
FIG. 4 is a disassembled perspective view showing an adjuster according to a second modified example.
Figure 5:
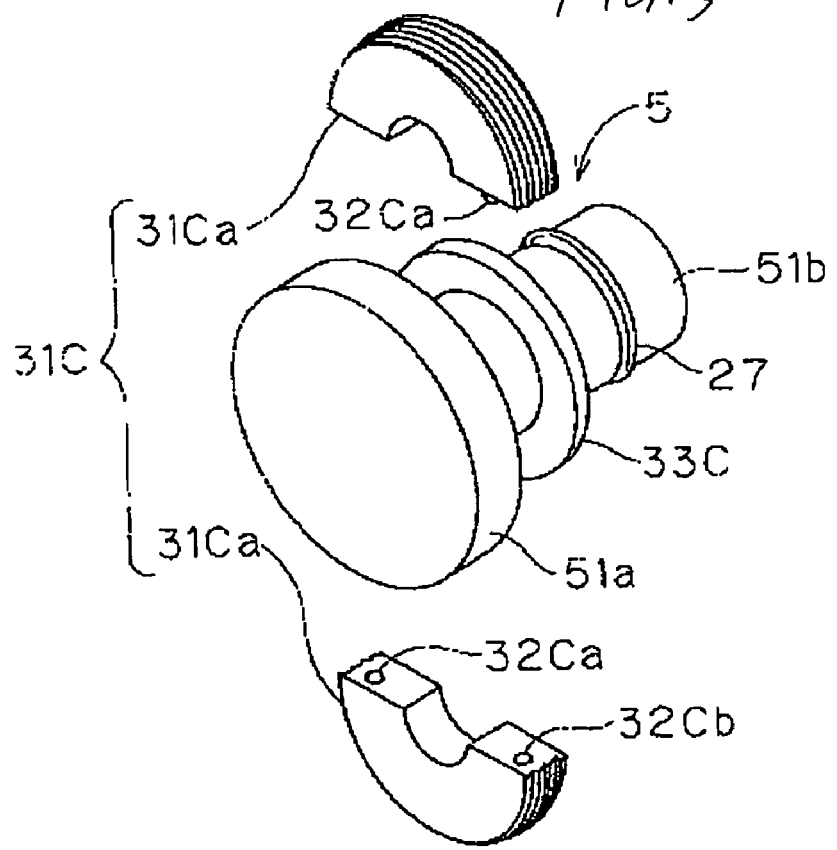
FIG. 5 is an explanatory view showing a state of attaching the adjuster to a lens unit.

Further, according to a second modified example shown in FIG. 4 and FIG. 5, an adjuster 31C configured by two divided members 31Ca is used in place of the adjuster 31.

Each of the divided members 31Ca is a member of a semicircular arc, an end portion thereof on one side is formed with a projected portion 32Ca, and an end portion thereof on other side is formed with a recess portion 32Cb capable of fitting the projected portion 32Ca. The two divided members 31Ca are configured by the same shape.

Further, the adjuster 31C having a similar configuration to that of the adjuster 31 is configured by butting the end faces of the two divided members 31Ca while fitting the respective recess portions 32Cb to the respective projected portions 32Ca to combine in a ring-like shape to arrange the lens unit 5 at a center portion thereof. Further, the two divided members 31Ca are combined together by an adhering agent or a well-known engaging structure or the like.

According to the second modified example, the lens unit 5 may integrally be formed with a ring-like draw preventing projected portion 33C and the adjuster 31C can be attached to the lens unit 5 at a later stage.

Therefore, it is not necessary to use a separate member for positioning to hold the adjuster 31, and the adjuster 31 can be prevented from being drawn out further firmly by a simple constitution.

Further, since the two divided members 31Ca are configured by members having the same shape, part control and integration thereof are facilitated.

Figure 6:
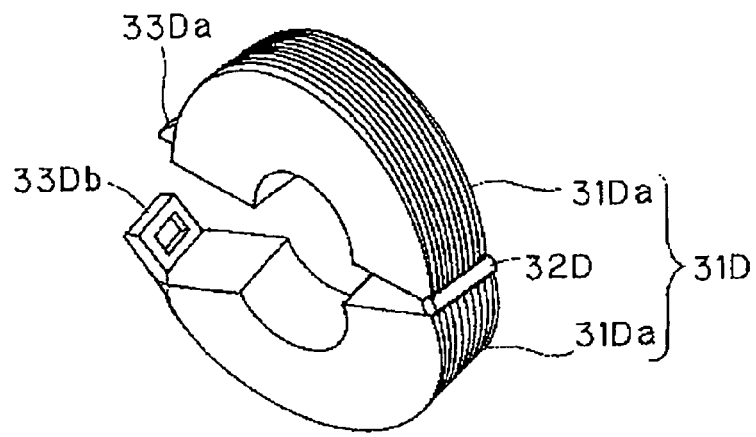
FIG. 6 is a perspective view showing an adjuster according to a third modified example.

According to a third modified example shown in FIG. 6, end portions on one side of divided members 31Da substantially in a shape of a semicircular arc are connected openably and closably by a hinge portion 32D, and other end portions thereof are formed with an engaging portion 33Da and an engaged portion 33Db.

Further, an adjuster 31D is a similar to that of the adjuster 31. The adjuster is configured by closing together the two divided members 31Da and engaging the engaging portion 33Da with the engaged portion 33Db to arrange the lens unit 5 at a center portion thereof.

According to the third modified example, similar to the second modified example, the adjuster 31D can be attached to the lens unit 5 integrally formed with the ring-like draw preventing projected portion 33C at a later stage. Therefore, it is not necessary to use a separated member for positioning to hold the adjuster 31 and the adjuster 31 can be prevented from being drawn out further firmly by a simple constitution.

Further, the adjuster 31 is integrated by connecting the two divided members 31Da by the hinge portion 32D and engaging the engaging portion 33Da and the engaged portion 33Db and therefore, integration thereof can easily be carried out.

Figure 7:
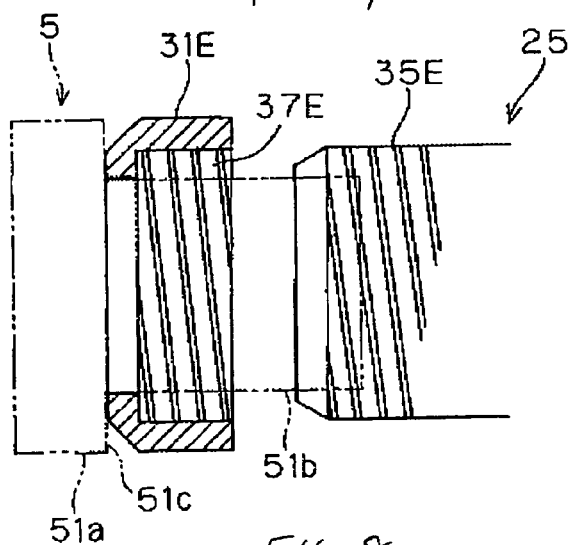
FIG. 7 is an explanatory view showing a fourth modified example.

According to a fourth modified example shown in FIG. 7, an adjuster 31E is formed to be able to be outwardly fitted to the holder portion 25. Further, an inner peripheral portion of the adjuster 31E is formed with a female screw portion 37E and the outer peripheral portion of the holder portion 25 is formed with a male screw portion 35E. Further, in a state of inserting to arrange the lens unit 5 in the holder portion 25, the adjuster 31E is screwed in a state of being outwardly fitted to the holder portion 25.

That is, the adjuster 31E may be screwed to the outer peripheral portion of the holder portion 25.

Figure 8:
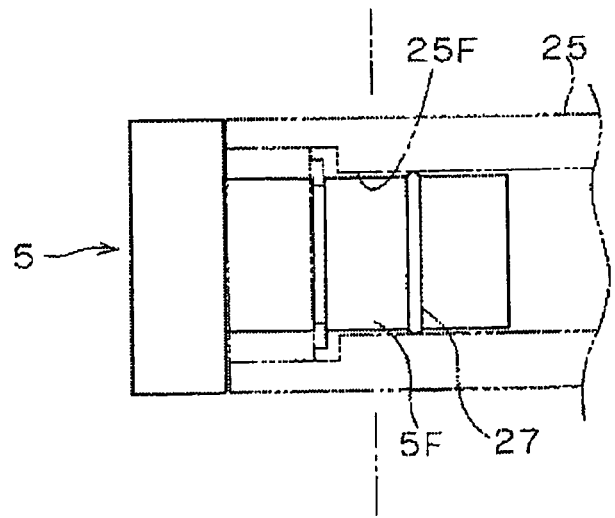
FIG. 8 is an explanatory view showing a fifth modified example.

According to a fifth modified example shown in FIG. 8, a portion 5F of the outer peripheral portion of the lens unit 5 inserted into the holder portion 25 is formed in a noncircular sectional shape, and an inner peripheral portion 25F of the holder portion 25 in correspondence therewith is formed in a noncircular shape capable of inserting the portion 5F in a state of stopping to rotate the portion 5F.

Figure 9:
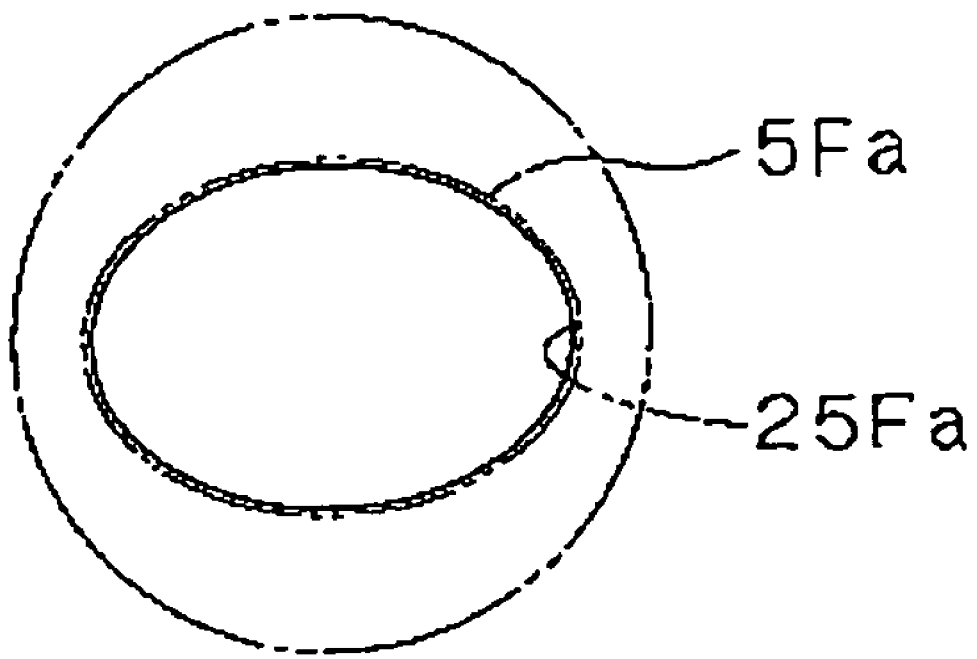
FIG. 9 is a view showing an example of a sectional shape of a lens unit.

For example, in FIG. 9, a portion 5Fa of the outer peripheral portion of the lens unit 5 and a portion 25Fa of the inner peripheral portion of the holder portion 25 are formed in an elliptical shape.

Figure 10:
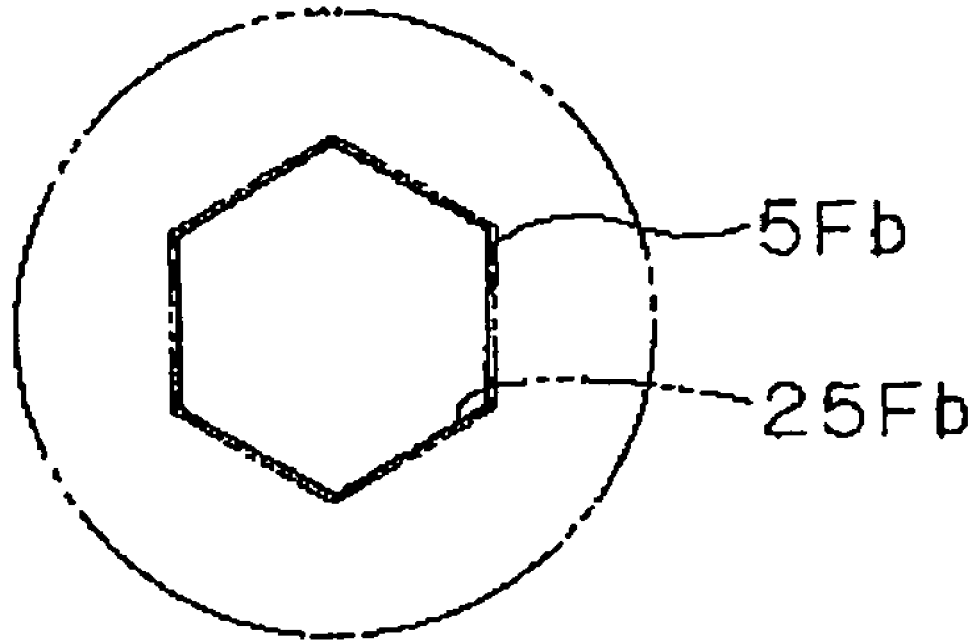
FIG. 10 is a view showing other example of a sectional shape of a lens unit.

Further, in FIG. 10, a portion 5Fb of the outer peripheral portion of the lens unit 5 and a portion 25Fb of the inner peripheral portion of the holder portion 25 are formed in a polygonal shape (regular hexagonal shape in this case).

Thereby, the adjuster 31E can be held in a state of being stopped to rotate.

Further, in the above-described embodiments and the respective modified examples, shapes of outer peripheral portions of portions of the adjusters 31, 31C, 31D, 31E operated by the hand or the like (for example, the flange-like operating portion 31b) may be formed in a noncircular shape of a polygonal shape (for example, hexagonal shape) or the like, or projected portions may be formed at the outer peripheral portions. Thereby, the adjusters 31, 31C, 31D, 31E can be facilitated to rotate by being grabbed by the hand or the like.

The above-described embodiments and the respective modified examples can pertinently be combined without a contradiction in view of the constitutions.

What is claimed is:

1. A lens fixing apparatus comprising:
a lens holder portion substantially formed in a cylindrical shape;
a lens unit operable to be inserted in the lens holder portion;
a retaining member; and
an adjuster member being rotatably attached to around either one of an axis of the lens holder portion and an axis of the lens unit, the adjuster member operable to be screwed to the other of the lens holder portion and the lens unit, the adjuster member being outwardly fitted or inwardly fitted rotatably to either one of the lens holder portion and the lens unit;
wherein:
the lens unit is movable in an axial direction of the lens holder portion without rotating relative to the lens holder portion, by rotating the adjuster member relative to the lens holder portion and the lens unit; and
the retaining member retains the fitted adjuster member.

2. A lens fixing apparatus according to claim 1, further comprising:
at least one screw fixing to the lens holder portion at least one of the adjuster member and the lens unit.

3. A lens fixing apparatus according to claim 1, wherein either one of an inner peripheral portion of the lens holder portion and an outer peripheral portion of the lens unit is formed with a recess groove portion along a direction of inserting the lens unit, and
wherein the other of the inner peripheral portion of the lens holder portion and the outer peripheral portion of the lens unit is formed with a projected portion that is fitted into the recess groove portion movably along a longitudinal direction thereof.

4. A lens fixing apparatus according to claim 1, wherein the adjuster member is rotatably attached to an outer peripheral portion of the lens unit,
an outer peripheral portion of the adjuster member is formed with a male screw portion,
an inner peripheral portion of the lens holder portion is formed with a female screw portion, and
the adjuster member is screwed to the lens holder portion when the lens unit and the adjuster member are inserted into the lens holder portion.

5. A lens fixing method, comprising:
inserting a lens unit in a lens holder portion which is substantially formed in a cylindrical shape;
rotatably attaching an adjuster member to around either one of an axis of the lens holder portion and the axis of a lens unit such that the adjuster member is outwardly fitted or inwardly fitted rotatably to either one of the lens holder portion and the lens unit;
retaining the fitted adjuster member with a retaining member;
screwing the adjuster member to the other of the lens holder portion and the lens unit; and
rotating the adjuster member relative to the lens holder portion and the lens unit so as to make the lens unit movable in an axial direction of the lens holder portion without rotating relative to the lens holder portion.

6. A lens fixing apparatus according to claim 4, wherein the lens unit is an anamorphic optical system.

7. A lens fixing apparatus according to claim 1, wherein the retaining member has a substantially C-like shape.

8. A lens fixing method according to claim 5, wherein the retaining member has a substantially C-like shape.

* * * * *